Patented Sept. 15, 1942

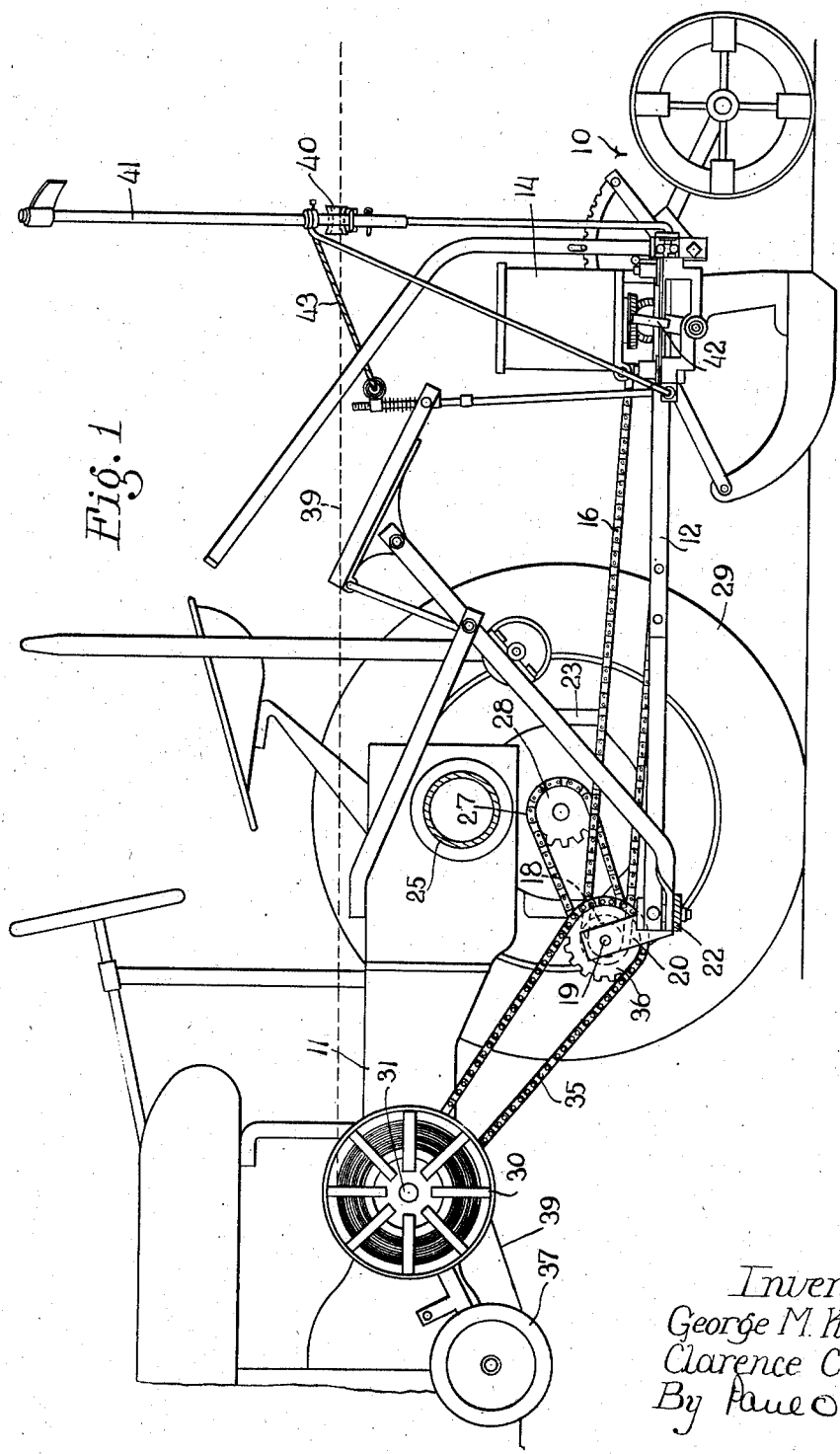

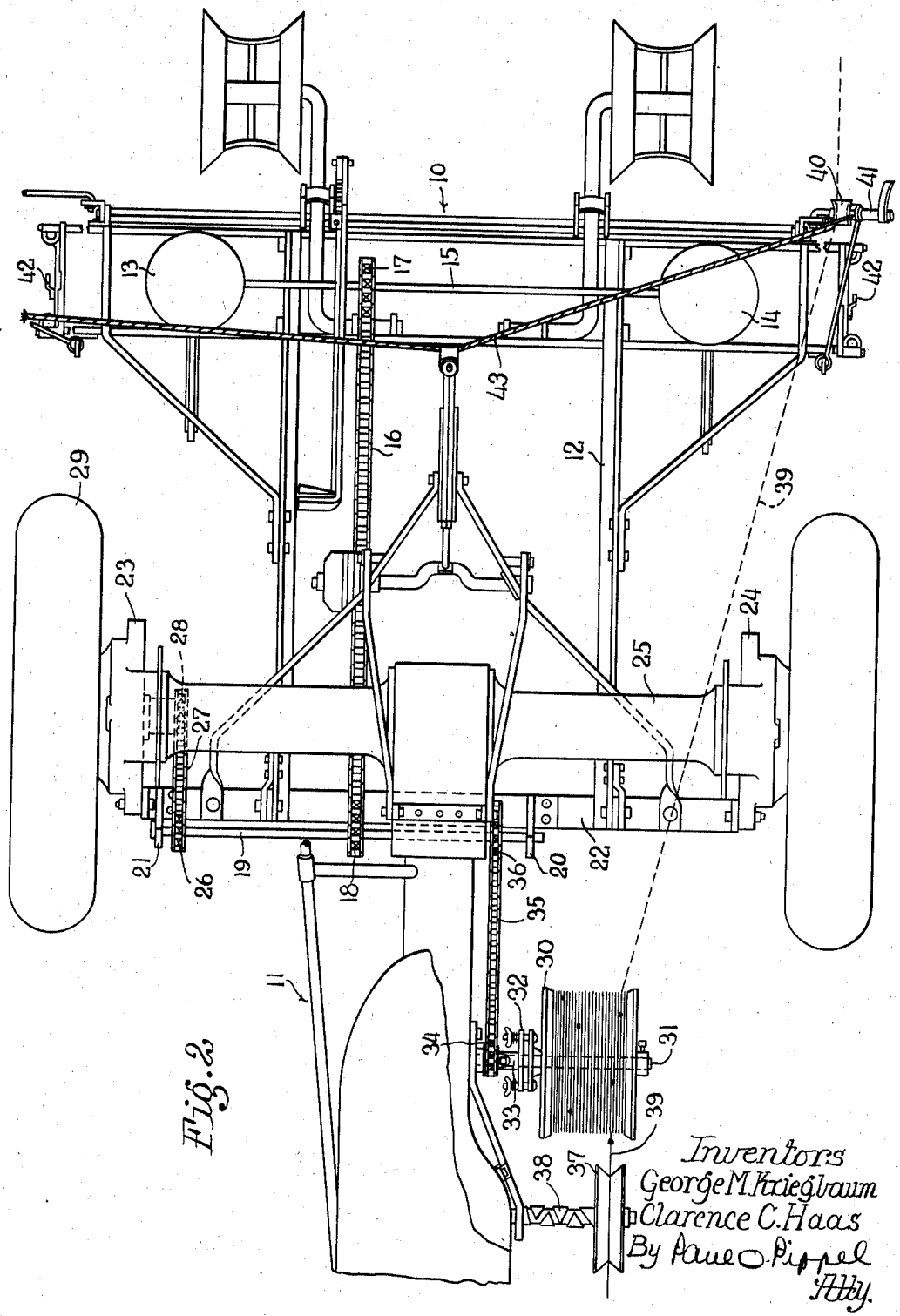

2,296,208

UNITED STATES PATENT OFFICE 2,296,208

REEL DRIVE FOR PLANTERS

George M. Kriegbaum and Clarence C. Haas, Richmond, Ind., assignors to International Harvester Company, a corporation of New Jersey Application March 3, 1941, Serial No. 381,482

11 Claims. (Cl. 111—44)

This invention relates to a reel drive for planters. More specifically it relates to the drive for a check-wire reel of a tractor-mounted planter.

An object of the present invention is to provide an improved planter.

A further object is the provision of a tractor-mounted planter.

Another object is to provide an improved drive for the check-wire reel of a planter.

A further object is to provide an improved mode for supporting a check-wire during unreeling thereof.

According to the present invention, a check-wire reel is mounted forward of the rear axle of a tractor at the rear of which a planter served by the reel is mounted, and the reel is driven from a power connection at the rear of the tractor such as the rear axle itself.

In the drawings:

Figure 1 is a side view of a tractor with a planter mounted thereon; and,

Figure 2 is a plan view of the same construction, with parts removed.

A planter 10 shown in the drawings is substantially like that shown in the patent to Kriegbaum et al., 2,171,034, August 29, 1939, being mounted on a tractor 11 and liftable with respect thereto in the manner shown in the aforementioned patent. The planter comprises essentially a frame 12 and planting devices 13 and 14. A drive shaft 15 extends between the devices and is driven by a sprocket chain 16 wrapped around a sprocket 17 secured to the shaft 15. The sprocket chain 16 extends forwardly to a point beneath the tractor and is wrapped around a sprocket 18 secured to a shaft 19. The shaft 19 is journaled at its ends in bearing members 20 and 21 secured to a supporting structure 22 connected to depending axle housings 23 and 24 at the ends of a tractor rear axle 25. The shaft 19 is driven by a sprocket 26 which is in turn driven by a chain 27 driven by a sprocket 28 mounted upon the depending housing 23 with its axis coinciding with that of a rear wheel 29. As seen in Figure 1, the axis of the sprocket 28 and the rear wheel 29 is considerably below the axis of the rear axle 25. The wheel 29, and the sprocket 28, which drives the planting devices 13 and 14 by means of the chains 16 and 27 and the shafts 15 and 19, are driven by the tractor axle 25 by means not shown, and form no part of the present invention.

A check-wire reel 30 is mounted upon a shaft 31 extending from the side of the tractor 11 forwardly of the rear axle 25. The reel 30 is connected by means of a slip clutch 32 to a sleeve member 33 connected to a sprocket 34. A chain 35 is wrapped about the sprocket 34 and also about a sprocket 36 secured to the shaft 19. The reel 30 is accordingly driven from the sprocket 28 connected with the rear axle 25 instead of from the regular power-take-off shaft at the rear of the tractor. Driving of the reel 30 along with the planter units 13 and 14 from the rear axle 25 presents a number of advantages over the arrangement shown in the aforementioned patent, by which the reel is driven by a regular power take-off shaft extending from the rear of the tractor. In the present case, the drive is entirely from a single source, whereas in the patent the drive has two sources. Furthermore, in the present case, the check-wire reel is mounted forward of the tractor rear axle, and the reel along with the planter is driven from a power connection at the rear of the tractor, which is the tractor rear axle. A sheave 37 and a member 38 having cross threads thereon and extending from the side of the tractor 11 form level-winding means for a check-wire 39 being wound upon the reel 30 as shown in full lines in Figure 2.

The dotted line extending from the check-wire reel 30 shows the check-wire 39 as it is being unreeled from the reel through an eye 40 secured to a marked arm 41. During planting the check-wire is engaged by checkheads 42 at opposite sides of the planter, and the marker arm 41 may be down or up depending on which side a mark is to be made, and a marker arm at the opposite side, not shown, connected with the arm 41 by a rope 43 will be up or down. When the check-wire is being unreeled through the eye 40, the marker arm 41 supporting the eye is up so that the wire clears the tractor axle and the planter.

It will be apparent from the foregoing description that a new and novel planter construction has been devised in which a check-wire reel for reeling up a check-wire and a planter are driven from the rear axle of the tractor upon which the planter is mounted, and the reel and planter are, respectively, forward and rearward of the rear axle and are driven from a power connection at the rear of the tractor, and the check-wire is unreeled through an eye mounted upon a marker arm, the unreeling taking place with the marker arm in its up position so that the eye is high enough to make the wire clear the tractor and the planter.

The intention is to limit the invention only within the spirit and scope of the appended claims.

What is claimed is:

1. The combination with a tractor having a rear axle, a planter connected at the rear of the tractor, and means driving the planter from the rear axle, of a check-wire reel mounted on the tractor, and means driving the check-wire reel from the rear axle.

2. The combination with a tractor having a rear axle, and a planter connected to the tractor, of a check-wire reel mounted on the tractor, and means for driving the check-wire reel from the rear axle.

3. The combination with a tractor having a rear axle and rear wheels driven by the rear axle and positioned with their axis below the axis of the rear axle, and a planter connected to the tractor, of a check-wire reel mounted on the tractor, and means for driving the check-wire reel from the tractor rear axle, including a gear mounted on the same axis as the axis of the rear wheels.

4. The combination with a tractor having a rear axle and depending housings at the ends thereof, a planter connected to the tractor, a gear mounted on a dependent housing and driven by the tractor rear axle, and means connecting the gear and the planter for driving the planter, of a check-wire reel positioned at the side of the tractor, and means connecting the gear and the check-wire reel for driving the reel.

5. The combination with a tractor having a rear axle and depending housings at the ends of the rear axle, a planter connected to the tractor, a first gear mounted on one depending housing and driven by the tractor rear axle, a shaft positioned beneath the tractor, a second gear secured to the shaft, a chain connecting the first gear and the second gear for driving the shaft, a third gear secured to the shaft, a chain connecting the third gear and the planter for driving the planter, of a check-wire reel mounted at the side of the tractor, a fourth gear secured to the shaft, and a chain connecting the fourth gear and the check-wire reel for driving the reel.

6. The combination with a tractor having a rear axle, a check-wire reel mounted at the side of the tractor, and a planter connected at the rear of the tractor and including a marker arm pivotally mounted for movement from a horizontal operative position to a vertical inoperative position, of means for supporting a check-wire during unreeling from the check-wire reel so as to clear the planter and the tractor axle, said means comprising an eye mounted upon the marker arm.

7. In combination, a tractor having a rear axle, a planter connected at the rear of the tractor and including a marker arm movable from horizontal position to vertical position, a check-wire reel mounted on the tractor, means driving the planter and the reel from the tractor axle, and means for supporting a check-wire during unreeling from the reel, said means comprising an eye mounted on the marker arm through which eye the check-wire is to be passed with the marker in vertical position.

8. The combination with a tractor having a rear axle, a planter connected at the rear of the tractor, and means driving the planter from the rear axle, of a check-wire reel mounted on the tractor forwardly of the axle, and means driving the check-wire reel from the rear axle.

9. The combination with a tractor having a rear axle, a check-wire reel mounted at the side of the tractor forwardly of the axle, and a planter connected at the rear of the tractor and including a marker arm pivotally mounted for movement from a horizontal operative position to a vertical inoperative position, of means for supporting a check-wire during unreeling from the check-wire reel so as to clear the planter and the tractor axle, said means comprising an eye mounted upon the marker arm.

10. The combination with a tractor having a rear axle and a power connection at the rear of the tractor, a planter connected at the rear of the tractor, and means driving the planter from the power connection, of a check-wire-reel mounted on the tractor, and means driving the check-wire-reel from the power connection.

11. The combination with a tractor having a rear axle and a power connection at the rear of the tractor, a planter connected at the rear of the tractor, means driving the planter from the power connection, of a check-wire-reel mounted on the tractor forwardly of the axle, and means driving the check-wire-reel from the power connection.

GEORGE M. KRIEGBAUM.
CLARENCE C. HAAS.